Aug. 25, 1936.                G. L. DIMMICK                2,052,220
                APPARATUS FOR PHOTOGRAPHICALLY RECORDING SOUND
                            Filed Jan. 31, 1933
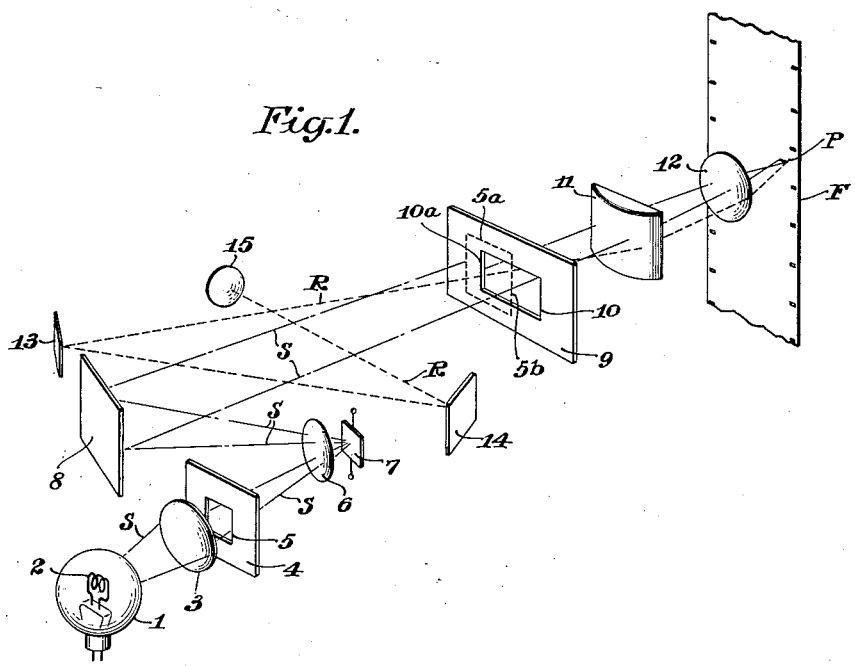
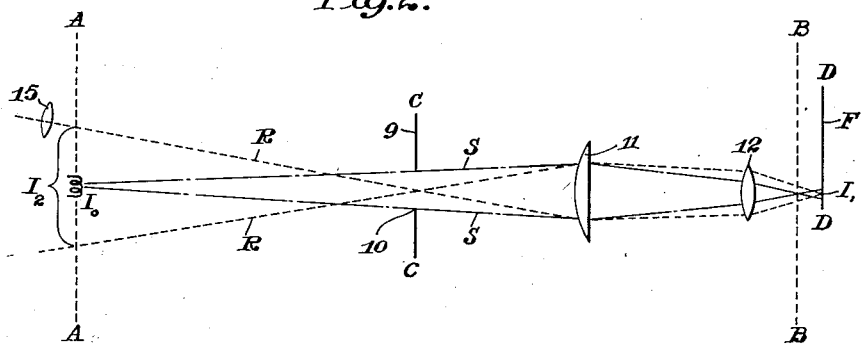
INVENTOR:
Glenn L. Dimmick,
BY T R Goldsborough
   HIS ATTORNEY.

Patented Aug. 25, 1936

2,052,220

UNITED STATES PATENT OFFICE 2,052,220

APPARATUS FOR PHOTOGRAPHICALLY RECORDING SOUND

Glenn L. Dimmick, Westmont, N. J., assignor to Radio Corporation of America, a corporation of Delaware Application January 31, 1933, Serial No. 654,373

6 Claims. (Cl. 179—100.3)

My invention relates to apparatus for photographically recording sound on a moving light sensitive member, and more particularly to a system in such apparatus by means of which it can be ascertained whether the recording optical system is in focus on the light sensitive member at the recording point.

In apparatus of this type, light from a suitable source is modulated in accordance with the sound being recorded and the modulated light is projected upon a sensitive film to form thereon a record of the sound. According to one method, the sound record is in the form of a band of constant width varying in intensity along its length, while by another method, the record is formed as a band of constant intensity, but of varying width along its length. With both methods, however, the recording light is first reduced to a fine beam or line of light before it reaches the film.

In order to satisfactorily record the sound, it is, obviously, necessary that the recording light beam be properly focused upon the film. To ascertain whether the recording light beam is in focus on the film, it has been proposed to insert angularly in the path of the beam a glass plate onto which the recording beam may be reflected by the film. Being disposed at an angle of about 45° with respect to the return beam, the glass plate reflects a part thereof in a direction normal to its path of travel, and this reflected part of the light beam is projected, by means of an optical device, onto a viewing screen where it is visible in the form of an enlarged image, or it may be viewed by means of an eye piece. Such a system is shown, for example, in the patents to Zworykin, No. 1,834,197 and Taylor, No. 1,847,636.

There are a number of disadvantages to a system of this sort. In the first place, the glass plate cuts down the effectiveness of the useful recording light beam first, because a part of the beam is deflected out of its path by reason of the fact that the glass plate is disposed at an angle to its path of travel and, secondly, because the glass plate accumulates dust, dirt, finger marks, etc., during handling. To prevent this, it is necessary to remove the plate and its associated optical device during operation of the recording apparatus, which means that the operator cannot determine the accuracy of focus of the recording line of light during operation of the apparatus.

Again, the glass plate not only cuts down the effectiveness of the recording beam as it travels toward the film, but it also cuts down the effectiveness of that portion which is reflected back by the film. This is accounted for by the fact that most of the returning beam passes on through the glass plate and only a small percentage thereof is deflected by the plate toward the viewing screen or eye piece.

Another great disadvantage of this system is that the glass plate produces a double image of the reflected light beam, since it has two reflecting surfaces, and one of the images is brighter than the other. The two images thus formed are not only displaced in parallel planes, but are also displaced laterally. Hence, it is difficult to ascertain, by this system, the exact condition of focus of the recording light on the film, and this is even more true if the glass plate is made thin, because the thinner the glass plate is, the more nearly do the two images reflected thereby become superposed, and the more blurred do they become.

In connection with the system employing a ground glass viewing screen, there is still another disadvantage. Even were the glass reflecting plate to reflect but a single image of the return beam onto the viewing screen, the operator would not necessarily obtain, from the viewing screen, a true picture of the recording light at the recording point on the film, unless the screen were first adjusted to a position where it is representative of the plane of the film. This is not only difficult and sometimes inconvenient, but requires the attention of a skilled operator.

The primary object of my invention is to provide an improved method of and system for determining whether a recording optical system, in apparatus of the type referred to, is in focus upon the film, which method and system will not be subject to the disadvantages of those of the prior art.

Another object of my invention is to provide an improved method and system of the type described by means of which the condition of focus of the recording light beam right at the recording point on the film can be accurately determined.

A further object of my invention is to provide an improved system of the type described which can be utilized while the recording apparatus is in operation, but which will not in any way interfere with the recording light beam.

Still another object of my invention is to provide an improved system of the type described which need not be removed from the recording apparatus while it is in operation in order to obtain the most efficient results, and which may, therefore, be made a permanent part of the recording apparatus.

It is another object of my invention to provide an improved method and system of the type described by means of which the condition of the recording light at the film can be directly viewed.

A further object of my invention is to provide an improved method and system of the type described which makes use of the full recording light and not merely a small fraction thereof.

Still a further object of my invention is to provide an improved system of the type described and for the purpose described which is exceedingly simple in construction, which can be easily used by one unskilled, which is very economical of manufacture, and which is extremely efficient in use.

In accordance with my invention, I employ a reflected portion of the recording light beam as heretofore, but instead of interposing in its path of travel toward the film any means which will reduce its efficiency and employing this means for deflecting a part of the return beam, I make use of that part of the recording light which is reflected along a path external to its path of travel toward the film. The return beam, according to my invention, is then directly viewed on a plane conjugate to the plane of the film with respect to the optical system which focuses the beam on the film and, therefore, a true picture may be seen of the light beam as it is actually focused on the film.

The novel features of my invention are set forth with particularity in the appended claims. The invention itself, however, both as to its organization and method of operation, together with additional objects and advantages thereof, will best be understood from the following description of a specific embodiment when read in connection with the accompanying drawing, in which Figure 1 is a diagrammatic perspective view illustrating a system in accordance with my invention, and Fig. 2 is a diagrammatic view illustrating the principle of operation thereof.

The system shown in Fig. 1 comprises a light source 1 having its filament 2 disposed in a horizontal direction, a condenser lens 3, a stop 4 having an aperture 5 therein, a lens 6 adjacent a galvanometer mirror 7, a reflector 8, a second stop 9 having a slot 10 therein, a cylindrical lens 11 which acts only in a horizontal plane, an objective lens 12, and a sensitive film F which may be advanced in any suitable manner well known to those skilled in the art. There is also provided, in the system shown in Fig. 1, a pair of reflectors 13 and 14 and an eye piece 15, the function of which will be presently set forth.

Acting in a vertical plane, the condenser 3 focuses an image of the filament 2 upon or near the galvanometer mirror 7, which is vibrated in accordance with the sounds being recorded in a manner also well known to those skilled in the art. The image formed on the mirror 7 is then reimaged upon the film F by means of the objective lens 12. The cylindrical lens 11 has no effect on the height of this image since it does not act in a vertical plane.

In a horizontal plane, the lens 6 focuses an image 5a of the aperture 5 upon the slot 10 which, in turn, is focused on the film F by the combination of cylindrical lens 11 and the spherical objective 12. The image 5a of the aperture 5 which is formed on the slot 10 is initially so adjusted that one edge thereof is located at about the center of the slot 10 and, as the mirror 7 is vibrated, the image moves across the slot 10, thus letting more or less through to the film. The length of the beam of light at the recording point P on the film is determined by the distance between the fixed edge 10a of the slot 10 and the movable edge 5b of the image 5a, while the height of the beam is determined by the diameter of the filament 2 and by lens 11.

According to my invention, I employ a beam of light which is reflected by the film at the recording point P, and view this reflected beam on a plane conjugate to the plane of the film F with respect to the condenser lens 12. Such a beam is shown dotted at R in Fig. 1, as distinguished from the recording beam which travels toward the film F from the light source 1 and the limits of which are illustrated by the solid lines S. The ray R, after being reflected by the film, returns by way of the objective 12 and the cylindrical lens 11 and is intercepted by a mirror 13 which directs it onto a second mirror 14, the latter, in turn, reflecting the ray R to an eye piece 15 through which the ray R may be viewed. If the light seen by the operator through the eye piece 15 indicates to him that the recording light is not in focus on the film, he can then adjust the optical system until it is in focus.

It will be noted from Fig. 1 that the path of the reflected or returning ray R is different than the path of the beam S which travels toward the film, and also that the mirrors 13 and 14, as well as the eye piece 15, are all external to the path of travel of the beam S. The arrangement is such that not only do the mirrors 13 and 14 not interfere with the recording light beam, but the image viewed by the eye piece 15 is as though it were in the plane of the galvanometer mirror 7 which, of course, is conjugate to the plane of the film F with respect to the cylindrical objective lens 12. Hence, a true picture of the recording light at the point P on the film may be seen through the eye piece 15.

The principle of operation of my invention can best be understood by reference to Fig. 2. In this figure, I have removed certain of the parts unnecessary to a clear understanding of the principle of operation and have shown only an image $I_0$ of the filament 2, the stop 9, the cylindrical lens 11, the objective 12, the film F, and the eye piece 15.

The vertical planes A—A and B—B are focally conjugate with respect to the combination of lens 11 and lens 12, as are also the planes C—C and D—D, while the planes A—A and D—D are focally conjugate with respect to the spherical objective lens 12. The solid lines S represent a set of limiting rays approaching the film F, and the dotted lines R illustrate a set of return rays reflected by the film. Since the planes A—A and D—D are conjugate focal planes, an image in the plane A—A of an object (or image-object) lying in the plane D—D will be exactly as much in focus in the plane A—A as an image in the plane D—D will be of an object (or image object) lying in the plane A—A. Hence, if one views in the plane A—A an image $I_2$ of an image $I_1$, which is formed in the plane D—D, by the lenses 11 and 12, of an object (or image-object) $I_0$ lying in the plane A—A, he will see the image $I_2$ focused exactly in the same manner in the plane A—A as the image $I_1$ is focused in the plane D—D.

In place of the filament 2 of Fig. 1, I have substituted the image $I_0$ thereof formed by the condenser 9 on the galvanometer mirror 7, and I refer to the plane of the mirror 7 as A—A. The image $I_0$ can then serve as an object source (an image-object) with reference to the images $I_1$ and $I_2$ for the sake of illustration.

The rays from the source $I_0$ are converged by means of the lenses 11 and 12 and form a small image of the filament in the plane B—B. After crossing, the rays diverge and form an image of the aperture 10 in the plane D—D.

Upon striking the white emulsion of the film, the light is irregularly reflected in all directions, some of it returning in the path indicated by the dotted lines R, R. The width of the return beam in the plane B—B is much greater than the direct beam S in that plane and, since the plane A—A is focally conjugate to the plane B—B, the return light covers a much greater width at A—A than does the source $I_0$. The lens or eye piece 15 may, therefore, be made to collect light which is reflected from the film without in any way interfering with the direct beam S.

In a vertical plane at right angles to the planes A—A, B—B, etc., the cylindrical lens 11 does not act. Any variations in the width of the beam at the film may, therefore, be detected by observing the reflected beam in the plane A—A, that is, at the image $I_2$.

From the foregoing description, it is evident that I have provided an improved system for and method of ascertaining accurately whether the recording light beam of a photographic sound recording device is in focus on the film. Since the reflected light beam is viewed on a plane conjugal to that of the film upon which the record is being made, it is obvious that my improved system enables the operator to view the condition of focus of the recording light beam directly, instead of indirectly, as on the ground glass screen of the prior art system hereinbefore referred to. Moreover, since my improved system does not depend for its successful operation upon the interposition of any devices into the path of the recording light beam in addition to those already present in the recording apparatus, but has all additional elements thereof external to said path, it is obvious that a better recording is possible by the use thereof. Furthermore, my improved system permits the viewing of a clear, single image representing the exact condition of focus of the recording light at the recording point, instead of the double image obtained by reason of the glass reflecting plate of the systems of the prior art.

It should be understood that, while I have shown and described a certain specific embodiment of my invention, I am fully aware that many modifications thereof are possible. Also, while I have shown my invention as applied to a sound recording system of the type which produces a sound track of constant density and variable width, it is apparent that it is equally applicable to a system by means of which a sound track of constant width but variable density is formed, as well as to a sound reproducing instead of a sound recording system. In fact, my invention is applicable to any photophonographic system. Therefore, wherever I have used the term "a system for photographically recording sound", I intend this to be used synonymously and interchangeably with the expression "a system for photographically reproducing sound", and wherever I have used the term "recording point", this should be read synonymously and interchangeably with the term "reproducing point". In any event, I desire that only such limitations shall be imposed on my invention as are necessitated by the prior art and are indicated in the appended claims.

What I claim is:

1. In a photophonographic system, the combination of a light source, a movable record surface, means for directing a beam of light from said source to said surface, a lens system including a cylindrical lens and a spherical lens for focusing said beam on said film in the form of a narrow line of light, and means whereby a portion of said light beam which is reflected by said surface can be directly viewed in a plane focally conjugate to the plane of said surface with respect to said spherical lens.

2. In a system for photographically recording sound, the combination of a light source, a movable film, means for directing a beam of light from said source to said film, optical means for focusing said beam on said film and for returning a portion of said beam reflected by said film along a path external to the path of travel of said light beam toward said film, and means in the path of said return beam whereby the condition of focus of said first named beam on said film can be ascertained.

3. In a system for photographically recording sound, the combination of a light source, a movable film, means for directing a beam of light from said source to said film, a lens for focusing said beam on said film in the form of a narrow line of light, said lens also serving to re-direct a beam of light reflected by said film in a path different than the path along which the beam travels to the film, and a member arranged externally to the path of travel of said beam in a direction toward said film, and in the path of said return beam, whereby the condition of focus of said beam on said film may be directly viewed.

4. In the art of recording sound photographically upon a moving film by means of an optical system, the method whereby the condition of focus of the recording light beam upon the film may be ascertained which comprises causing a portion of the recording light beam which is reflected by the film to return in a path different than that along which it is directed onto the film by the optical system, and simultaneously expanding said reflected beam of light while projecting it onto a plane focally conjugate to the plane of the film with respect to said optical system, at which first named plane the reflected light beam may be viewed.

5. In a photophonographic system the combination of a light source, means for directing a beam of light from said source to a record surface, a lens system including a cylindrical lens and a spherical lens for focusing said beam on said surface in the form of a narrow line of light, said cylindrical lens serving also to expand a ray of light reflected back through said optical system by said surface onto a plane focally conjugate to the plane of said surface with respect to said spherical lens, and means whereby said reflected light ray may be directly viewed in said first named plane.

6. In the art of recording sound photographically upon a moving film by means of an optical system arranged to focus a beam of light on said film, the method whereby the condition of focus of the recording light beam upon the film may be ascertained which comprises selecting a portion of the recording light beam which is reflected by the film and is re-directed by said optical system in a path external to the path of travel of said recording light beam toward the film, and viewing said return beam from a point in its path.

GLENN L. DIMMICK.